Aug. 26, 1947.                M. SPECTOR                2,426,419
                      RETURN TRACE BLANKING AND MIXING
                             Filed Dec. 23, 1942
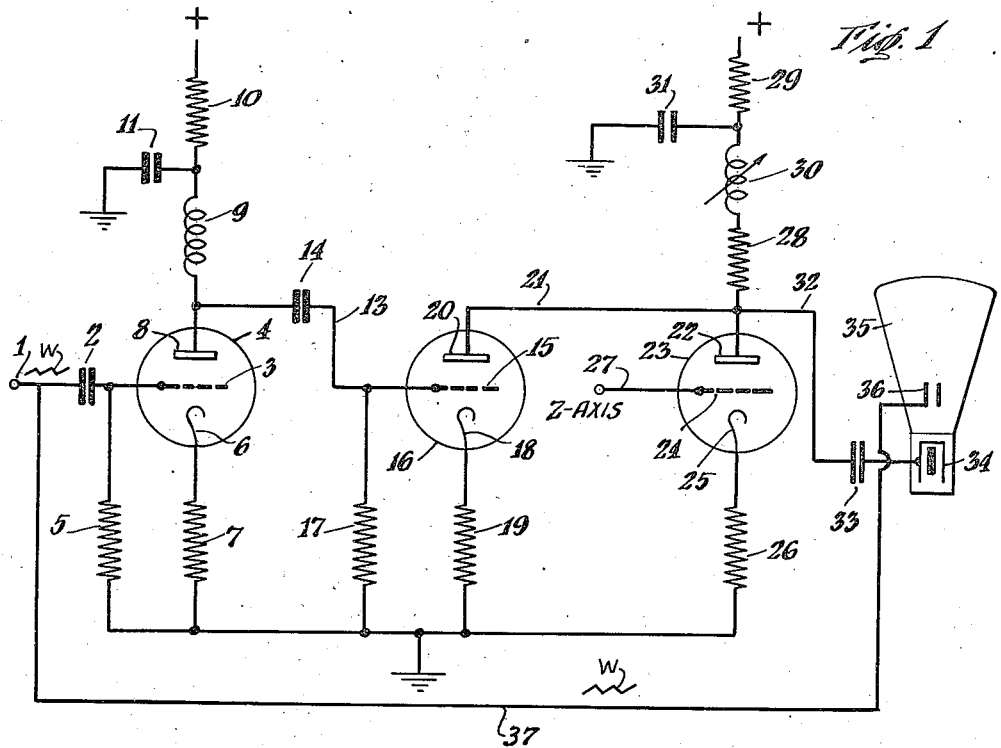
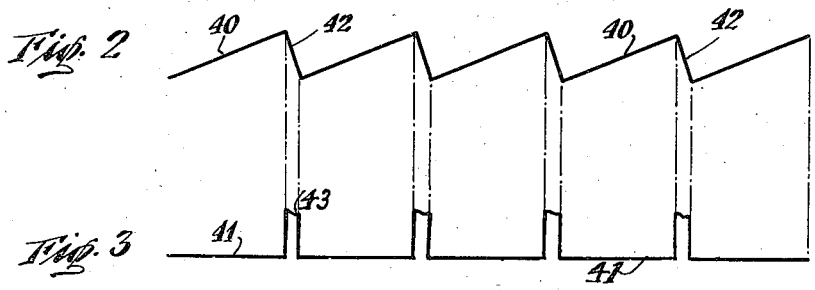
Morris Spector, INVENTOR.
BY
Charles W. Mortimer
ATTORNEY Patented Aug. 26, 1947

2,426,419

UNITED STATES PATENT OFFICE 2,426,419

RETURN TRACE BLANKING AND MIXING

Morris Spector, Jersey City, N. J., assignor to Allen B. Du Mont Laboratories, Inc., Passaic, N. J., a corporation of Delaware Application December 23, 1942, Serial No. 469,903

3 Claims. (Cl. 315—22)

This invention relates to a device for blanking or cutting off the cathode-ray beam of an oscillograph during the return intervals or return periods of the time-base sweep. Such blanking is desirable so that the return trace on the screen will not obscure the signal that is produced by the combined effects of the X-axis or sweep circuit impulses and the Y-axis or unknown signal deflecting impulses.

With high frequency sawtooth sweeps the return time at the beginning of which the beam is to be extinguished and at the end of which the beam is to be active is exceedingly short, becoming only a few microseconds in many instances. At low sweep frequencies it is not so essential to extinguish the beam during return time but in cases where the frequency becomes higher the return time becomes relatively long with respect to the sweep interval. It may be in the order of 25% to 40% of the total time of a sweep when the frequency is in the tens of thousands of cycles per second, thereby causing confusion or distortion of the pattern or inaccuracy in the same.

By the present invention confusion resulting as indicated above is obviated by blanking the beam at the start of the return trace and cutting off the blanking at the end of the return trace or the beginning of the desired linear trace. This is accomplished by applying to the grid of a vacuum tube having an inductance in its plate circuit the sawtooth voltage that is used for the X-axis deflection of the cathode-ray beam. The output from this tube is connected, after amplifying it when needed, to the control grid of the cathode-ray tube or oscillograph.

The invention may be understood from the description in connection with the accompanying drawing, in which:

Fig. 1 is a diagram of connections; and

Figs. 2 and 3 are diagrams showing wave shapes.

The input terminal 1 is connected to the output of a sawtooth wave generator of any suitable sort known in this art, the sawtooth wave being indicated at W. The terminal 1 is coupled by capacitor 2 to the grid 3 of the tube 4 provided with a grid leak resistor 5. The cathode 6 of tube 4 is loaded with bias resistor 7. The plate 8 is connected to a source of positive potential through an inductor 9. A resistor 10 with a capacitor 11 between ground and the other side of the inductor 9 from the plate 8 may be added for filtering purposes.

The plate 8 is connected by lead 13 through capacitor 14 to the grid 15 of vacuum tube 16 having grid leak 17. The cathode 18 is loaded with a bias resistor 19. The plate 20 is connected by lead 21 to the plate 22 of vacuum tube 23 having a grid 24 and cathode 25, this cathode being loaded with bias resistor 26.

The grid 24 of tube 23 is connected through lead 27 to the source of Z-axis or cathode-ray tube grid modulating signals for an oscilloscope.

The plates 20 and 22 are connected through resistors 28 and 29 and variable inductor 30 to a source of positive potential with a capacitor 31 connected from a point between resistor 29 and inductor 30 to ground. The lead 32 connects from plate 22 through capacitor 33 to the control grid 34 of the cathode-ray tube or oscillograph tube 35 which has beam deflecting means such as plates 36. The lead 37 extends from the input terminal 1 to one of the deflecting plates 36.

The operation is as follows:

It is well known with sawtooth sweeps that during the comparatively long intervals in which the voltage of a sawtooth wave of voltage is slowly changing, the beam of the cathode-ray tube or oscillograph should be on, and that during the short periods of return time of rapid voltage change, the beam should be blanked or cut off.

Such a sawtooth wave W of the proper periodicity is applied to the input terminal 1 and is amplified by the amplifier 4. As represented in Figs. 2 and 3, during the time while the voltage of the sawtooth wave is increasing at a constant rate on the grid 3 as shown at 40, Fig. 2, the output through lead 13 to grid 15 remains constant, as shown at 41, Fig. 3, due to the inductor 9 having low impedance for this slow change of plate current. As soon as this voltage begins to decrease rapidly as represented by the beginning of any steep portion 42 of the sawtooth wave, a high signal voltage 43 is developed on output lead 13 and drops to the value 41 at the end of each period of time 42. Such a "differentiating" inductance produces a voltage of the general shape shown in Fig. 3 which when applied with proper polarity is suitable for return trace blanking.

The wave 41—43 is amplified by the amplifier 16 of good frequency response and may be mixed by the mixer 23 with a Z-wave that is applied by lead 27 to its grid 24. The wave 41—43 is applied to the control grid 34 of the oscillograph 35 while the wave 40—42 is applied to the deflecting plates 36, and since the impulses 43 occur exactly during the return trace intervals shown at 42 and are of sufficiently large magnitude to cut off the beam the sweep is blanked out during the return periods. The mixer amplifier is desirable since it allows timing or other signals to be applied to the cathode-ray tube grid for use on the visible portion of the sweep trace, and return trace blanking still remains in operation.

What is claimed is:

1. In a device for blanking the beam of a cathode-ray tube having beam deflecting means, means for blanking said beam during return intervals of said beam, said means comprising in combination a vacuum tube having a source of positive current connected through an inductance coil to its plate, an amplifier for the output of said tube, a vacuum tube in parallel with said amplifier having resistance and an inductance coil in series in its plate circuit.

2. The device of claim 1 in which the cathodes of said tubes and amplifier are biased by resistances.

3. The device of claim 1 in which means are provided to connect the grid of said last named vacuum tube to the source of Z-axis signals for said cathode-ray tube.

MORRIS SPECTOR.

REFERENCES CITED

The following references are of record in the file of this patent:

UNITED STATES PATENTS

| Number | Name | Date |
|---|---|---|
| 2,202,612 | Urtel | May 28, 1940 |
| 2,051,372 | Farnsworth | Aug. 18, 1936 |
| 2,285,043 | Messner | June 2, 1942 |
| 2,265,780 | Schlesinger | Dec. 9, 1941 |
| 2,282,992 | Deserno | May 12, 1942 |
| 2,280,524 | Hansen | Apr. 21, 1942 |
| 2,179,243 | Ives | Nov. 7, 1939 |
| 2,122,990 | Poch | July 5, 1938 |
| 2,116,671 | Dowsett et al. | May 10, 1938 |
| 2,092,373 | Holmes | Sept. 7, 1937 |
| 2,258,370 | Taylor et al. | Oct. 7, 1941 |
| 2,197,900 | Schlesinger | Apr. 23, 1940 |
| 2,303,924 | Faudell | Dec. 1, 1942 |
| 2,210,702 | Bowman-Manifold | Aug. 6, 1940 |
| 2,153,655 | Urtel et al. | Apr. 11, 1939 |
| 2,137,262 | Bowman-Manifold | Nov. 22, 1938 |
| 2,074,495 | Vance | Mar. 23, 1937 |
| 2,151,149 | Poch | Mar. 21, 1939 |